United States Patent
Gaessler et al.

(10) Patent No.: US 7,143,726 B2
(45) Date of Patent: Dec. 5, 2006

(54) METHOD AND DEVICE FOR CONTROLLING THE OPENING OF AN INTAKE VALVE OF AN INTERNAL COMBUSTION ENGINE

(75) Inventors: Hermann Gaessler, Vaihingen (DE); Ernst Wild, Oberriexingen (DE); Udo Diehl, Stuttgart (DE); Karsten Mischker, Leonberg (DE); Rainer Walter, Pleidelsheim (DE); Ruediger Weiss, Moetzingen (DE); Andreas Baumann, Vaihingen/Enz (DE); Lutz Reuschenbach, Stuttgart (DE); Bernd Rosenau, Asperg (DE); Juergen Ulm, Eberdingen (DE); Juergen Schiemann, Markgroeningen (DE); Christian Grosse, Kornwestheim (DE); Georg Mallebrein, Korntal-Muenchingen (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/504,623

(22) PCT Filed: Nov. 28, 2002

(86) PCT No.: PCT/DE02/04366

§ 371 (c)(1),
(2), (4) Date: Jan. 27, 2005

(87) PCT Pub. No.: WO03/069148

PCT Pub. Date: Aug. 21, 2003

(65) Prior Publication Data

US 2005/0120996 A1 Jun. 9, 2005

(30) Foreign Application Priority Data

Feb. 14, 2002 (DE) ............................ 102 05 967

(51) Int. Cl.
*F02B 41/04* (2006.01)
(52) U.S. Cl. .................................... 123/90.15; 123/26
(58) Field of Classification Search ................ 123/316, 123/26, 90.11, 90.12, 90.15, 90.16, 90.17
See application file for complete search history.

(56) References Cited

U.S. PATENT DOCUMENTS 3,814,065 A * 6/1974 Gospodar ................... 123/26

(Continued)

FOREIGN PATENT DOCUMENTS

DE 100 18 303 10/2001

(Continued)

*Primary Examiner*—Stephen K. Cronin
*Assistant Examiner*—Jason Benton
(74) *Attorney, Agent, or Firm*—Kenyon & Kenyon (57) ABSTRACT

A method for controlling the opening of at least one intake valve of a combustion chamber in a periodically working piston engine, at least one intake valve of the combustion chamber being opened during a first partial period of a working period of the piston engine for charging the combustion chamber; and at least one intake valve of the combustion chamber being opened during a second partial period of the working period, wherein the second partial period begins after the combustion of the combustion chamber charge and has no overlap with the first partial period.

13 Claims, 4 Drawing Sheets

U.S. PATENT DOCUMENTS

| | | | |
|---|---|---|---|
| 5,732,677 A * | 3/1998 | Baca | 123/316 |
| 5,878,714 A * | 3/1999 | Dai et al. | 123/316 |
| 5,970,944 A * | 10/1999 | Kawamura | 123/258 |
| 6,135,086 A * | 10/2000 | Clarke et al. | 123/316 |
| 6,571,770 B1 * | 6/2003 | Codan et al. | 123/432 |
| 6,581,557 B1 * | 6/2003 | Gaessler et al. | 123/90.15 |
| 6,651,624 B1 * | 11/2003 | Gaessler et al. | 123/435 |
| 6,807,956 B1 * | 10/2004 | Gaessler et al. | 123/568.14 |
| 6,907,859 B1 * | 6/2005 | Robinson | 123/316 |
| 2003/0136375 A1 * | 7/2003 | Reitz et al. | 123/316 |
| 2003/0213463 A1 * | 11/2003 | Coleman et al. | 123/305 |

FOREIGN PATENT DOCUMENTS

| | | |
|---|---|---|
| EP | 0 473 258 | 3/1992 |
| WO | 99 32781 | 7/1999 |

* cited by examiner

FIG.8

METHOD AND DEVICE FOR CONTROLLING THE OPENING OF AN INTAKE VALVE OF AN INTERNAL COMBUSTION ENGINE

FIELD OF THE INVENTION

The present invention relates to a method and a device for controlling the opening of at least one intake valve of a combustion chamber of a periodically operating piston engine, at least one intake valve of the combustion chamber being opened during a first partial period of a working period of the piston engine for charging the combustion chamber, and at least one intake valve of the combustion chamber being opened during a second partial period of the operating period.

BACKGROUND INFORMATION

European Patent document no. 473 258 A2 refers to an intake valve that is opened twice during one working period. The first opening begins in the range of the top dead center of a piston and ends in the intake stroke during the downward movement of the piston.

The second opening begins at or after the lower dead center of the piston, at the beginning of the compression stroke, and ends before the end of the compression stroke. The exemplary method is used at low loads of the internal combustion engine, which are distinguished by a low charge of the combustion chamber with combustible mixture. This slight quantity may be sucked in already using a relatively short first opening of the intake valve. Therefore, the intake valve may be closed before the end of the intake stroke.

Because of the piston running further in the direction of the bottom dead center while the intake valve is closed, a decreasing pressure is generated in the combustion chamber, whose absolute value undershoots the intake manifold pressure. Because of this pressure drop, upon the second opening of the intake valve in the bottom dead center or after the bottom dead center, additional air or additional mixture flows into the combustion chamber. The flow brought on by the pressure drop causes a desired turbulence in the combustion chamber, which improves the preparation of the mixture for the subsequent combustion.

To the extent that this involves the heating of a catalytic converter in the exhaust gas of the internal combustion engine, this document suggests an earlier opening of the exhaust valve in the combustion stroke, because in this way less energy would be converted to mechanical work, and as a result, the exhaust gases would be hotter. In order to heat up a catalytic converter and to reduce hydrocarbon emissions after a cold start of an internal combustion engine, frequently so-called secondary air is blown in after the exhaust valves of the internal combustion engine. The secondary air is blown in as fresh air via an electric pump, and it allows for the oxidation of uncombusted hydrocarbons in the exhaust gas that is still hot.

In this context, the internal combustion engine may be operated using excess fuel, so as to supply hydrocarbons as reaction partner for the secondary air blown in. The post-oxidation of the hydrocarbons not combusted in the combustion chamber using the blown-in secondary air generates an exothermic reaction in the exhaust gas system and allows for a rapid heating up of the catalytic converter.

In this context, one may differentiate between a reaction in the exhaust manifold and a reaction in the catalytic converter. If a reaction is desired in the manifold, the exhaust gas has to come together with the secondary air as early as possible after the combustion of the combustion chamber charge. Therefore, the location of introduction of the secondary air often lies directly at the exhaust valves of the internal combustion engine.

Besides the classical injection of secondary air with the aid of an electric pump, one may operate individual cylinders of an internal combustion engine alternatingly using excess fuel and excess oxygen, in order to achieve a secondary air effect upon guiding together the exhaust gas from the combustion with excess fuel with the exhaust gas from the combustion with excess air.

SUMMARY OF THE INVENTION

An object of the exemplary method and/or embodiment of the present invention is to provide a method and a device for a combustion engine having fully variable valve control, which allows for the supply of secondary air to the exhaust gas without using a secondary air pump or a secondary air valve. In this context, the quantity of secondary air is to be variable.

This object may be attained by the above method described herein in which the second partial period begins after combustion of the combustion chamber charge, and does not overlap with the first partial period.

With the aid of the exemplary method according to the present invention, post-oxidation of uncombusted hydrocarbons may be achieved directly in the combustion chamber. For this purpose, the intake valve is opened in the expansion phase at the point in time at which the pressure in the combustion chamber has approximately reached the manifold pressure or undershot it. The fresh air flowing, in this case, into the still very hot exhaust gas takes care of a post-oxidation of uncombusted hydrocarbons. The quantity of secondary air may be varied by the selection of the valve lift and/or the closing time of the intake valve. Thereby one may save a secondary air pump and a secondary air valve. The only assumption is that the fully variable valve control provides for opening the intake valve twice per operating period. In this context, the first opening is used to fill the combustion chamber with air for generating the combustion chamber charge required for the torque demanded, and the second opening is used for secondary air metering.

An exemplary method provides that the second partial period begins before a bottom dead center of the piston appertaining to the combustion chamber. The pressure in the combustion chamber decreases with the approach of the piston to the bottom dead center. Therefore one may conclude what the pressure in the cylinder is, from the position of the piston.

The triggering of the second partial period as a function of the piston position thereby may have the advantage that the point in time at which the inner pressure of the cylinder or the inner pressure of the combustion chamber undershoots the intake manifold pressure may be given without a special combustion chamber pressure sensor.

Another exemplary embodiment provides that the second partial period begins at that point when the pressure on the side of the intake valve that faces the combustion chamber has sunk to the value of the pressure on the side of the intake valve facing away from the combustion chamber, or has even undershot it.

Another exemplary embodiment provides that the length of the second partial period and/or the degree of the opening of the intake valve is a function of operating parameters of the piston engine.

Another exemplary embodiment provides that the charge of the combustion chamber is limited by an early closing of the intake valve, and that the exemplary method is carried out at the highest possible intake manifold air pressure.

Another exemplary embodiment provides that the exemplary method is carried out only below a threshold value for the combustion chamber charge. The reason is that, at large combustion chamber charges, at the end of the expansion stroke, the low absolute pressure in the combustion chamber/cylinder required for drawing in secondary air from the intake manifold is not achieved.

Another exemplary embodiment provides that, in the case of a combustion chamber having a plurality of intake valves, at least one first intake valve is opened during the first partial period, and at least one second intake valve is opened during a second partial period.

The exemplary embodiment of the present invention also provides a control device for implementing at least one of the abovementioned methods, embodiments and measures. One embodiment of this control unit provides that the control unit will increase the idling speed of the piston engine if one of the abovementioned methods, embodiments or measures is carried out. An increased idling speed lowers the fresh air charge required for the idling. Therefore, by having an elevated idling speed, the abovementioned threshold value for the combustion chamber charge may be undershot. For, it has been shown that the exemplary method runs in a satisfactory manner only for fresh air charges of the combustion chamber up to approximately 35% of the maximum combustion chambers charges.

At higher charges, the final expansion charge is not less than the intake manifold pressure. The hydrocarbon emissions then have to be lowered in a different manner. At higher fresh air charges, the lean-mixture drivability of the piston engine is better. Therefore, at combustion chamber charges above 35% of the maximum charge, the internal combustion engine may be operated in an increasingly lean manner.

Another exemplary embodiment provides, also for decreasing the charge, that the control unit transfers the shifting points of an automatic transmission towards greater rotary speeds if a method for blowing in secondary air through an opening of an intake valve is to be carried out at the end of the expansion stroke. Therefore, the exemplary method and/or embodiment of the present invention also relates to a control unit that is distinguished by operating the piston engine in an increasingly lean manner with increasing combustion chamber charge, i.e. using fuel/air mixture poorer in fuel, in the case of carrying out the blowing in of secondary air by opening an intake valve at the end of the expansion stroke.

DETAILED DESCRIPTION

Figure 1:
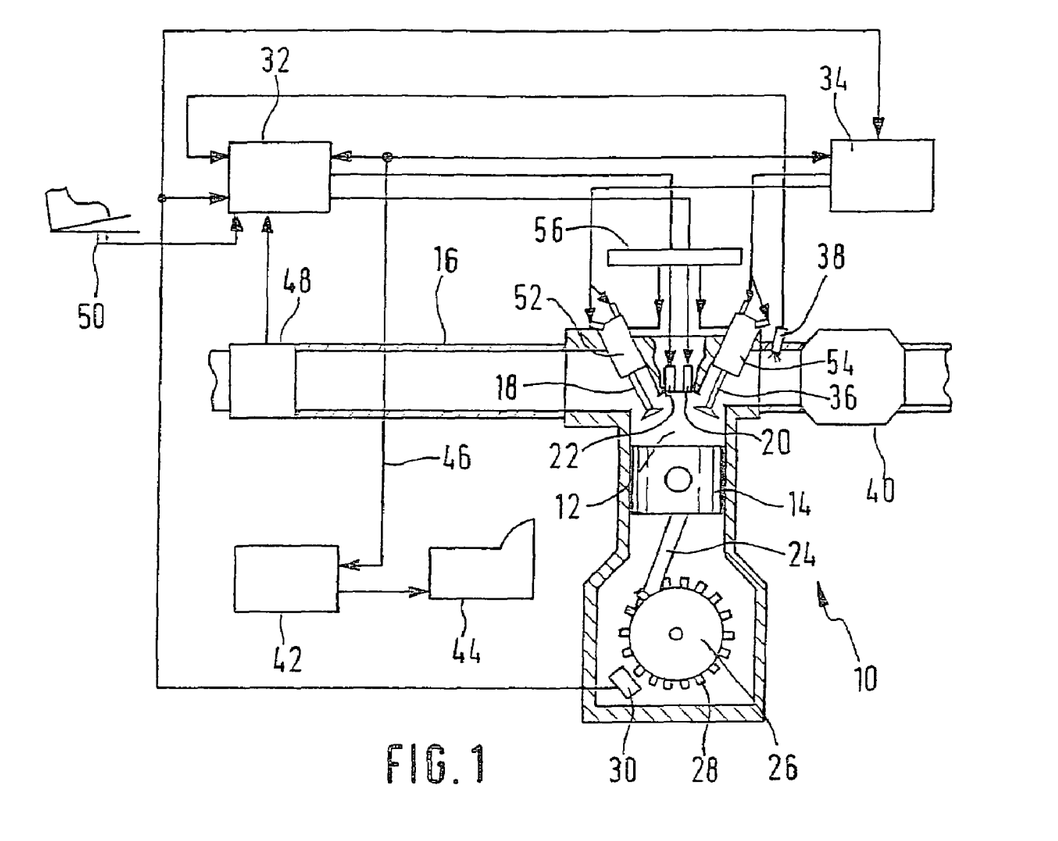
FIG. 1 shows the technical environment in which the exemplary method and/or embodiment of the present invention shows its effect.

The number 10 in FIG. 1 denotes a piston engine having a combustion chamber 12 which is movably sealed by a piston 14. Combustion chamber 12 is filled with air from an intake manifold 16 via an intake valve 18 when the piston moves downwards. To the combustion chamber air charge, fuel is supplied via a fuel injector 20, and the fuel/air mixture thus created is ignited with the aid of a spark plug 22. The force on piston 14 created by the combustion is converted to a rotary motion of a crankshaft via a crankshaft drive 24. A pulse-generating wheel 26 is rotatably fixed to the crankshaft, and it bears ferromagnetic markings 28.

During the rotating motion of the pulse-generating wheel 26, the ferromagnetic markings 28 brush past an inductive pickup 30, which forms from this a periodic electrical signal which it supplies to an engine control unit 32 and to a valve control unit 34. Both engine control unit 32 and valve control unit 34 are able to derive the position of the piston from this, and are able to control the injection of fuel, the triggering of the ignition as well as the operation of intake valves 18 and exhaust valves 36 in a phase-synchronized manner with the movement of piston 14. Thus, for example, exhaust valve 36 is opened when piston 14 is running upwards again, for expelling the combusted gases from combustion chamber 12.

An exhaust gas sensor 38, such as an oxygen-sensitive lambda probe or an NOx sensor or an HC sensor, supplies a signal to engine control unit 32, so as to control, for example, the lean operation desired in one exemplary embodiment of the present invention. The combusted gases run through a catalytic converter 40, which converts NOx, CO and HC to nitrogen oxide, carbon dioxide and water, when it is in the hot operating state.

FIG. 1 also shows a transmission control unit 42 and an automatic transmission 44. The three control units 32, 34 and 42 are connected via a bus system 46, such as a CAN bus. It should be understood that the subdivision of the functions to three control units that communicate with one another by a bus is not essential, and that the required functional scope could also be covered by a single control unit having the equivalent capabilities. The function of the transmission control unit relates to another aspect of an exemplary embodiment of the present invention. The control unit composite consisting of the engine control unit and the valve control unit consequently represents an exemplary embodiment of a device according to the present invention.

Besides the signals of inductive pickup 30 and exhaust gas sensor 38, additional variables are supplied to engine control unit 32, especially the signal of an air mass flow sensor 48 which records the mass of the air aspirated by piston engine 10, and an accelerator sensor 50 which, to an extent, supplies information concerning the torque demand by the driver. Valve control unit 34 controls an intake valve actuator 52 and an exhaust valve actuator 54. Intake valve actuator 52 and exhaust valve actuator 54 may be implemented as electrohydraulic actuating elements which are connected to a high-pressure accumulator 56, which contains hydraulic fluid.

Figure 2:
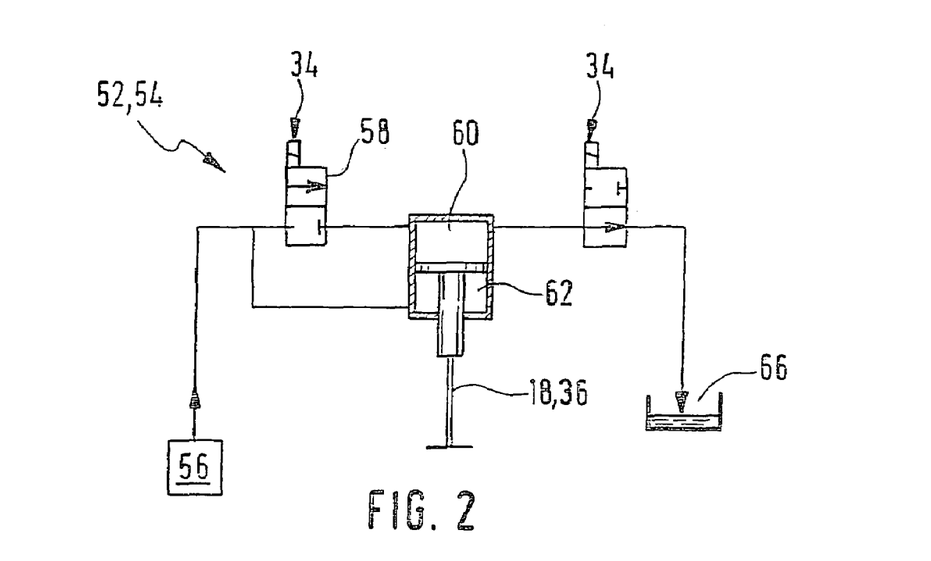
FIG. 2 shows schematically an exemplary embodiment of a fully variable valve control.

FIG. 2 shows an exemplary embodiment of an intake valve actuator 52 or an exhaust valve actuator 54. Hydraulic fluid from high-pressure accumulator 56 flows via a first magnetic valve 58 into chamber 60, opens intake valve 18 or exhaust valve 36 and displaces the hydraulic fluid in chamber 62. When the desired valve lift has been achieved, first magnetic valve 58 is closed by valve control unit 34. In order to close intake valve 18 or exhaust valve 36, second magnetic valve 64 is opened. In this context, first magnetic valve 58 remains closed. The pressure of the hydraulic fluid that is constantly present at chamber 62 closes intake valve 18 or exhaust valve 36. Hydraulic fluid flowing out of chamber 62 is collected in a reservoir 66. With the aid of the valve actuator shown, individual control may be provided for each valve. In this context, the charge of the combustion chamber with fresh air may be set by the duration of being open and/or the lift of intake valve 18. At least at low rotary speeds, an intake valve may be opened several times per operating period.

Figure 3:
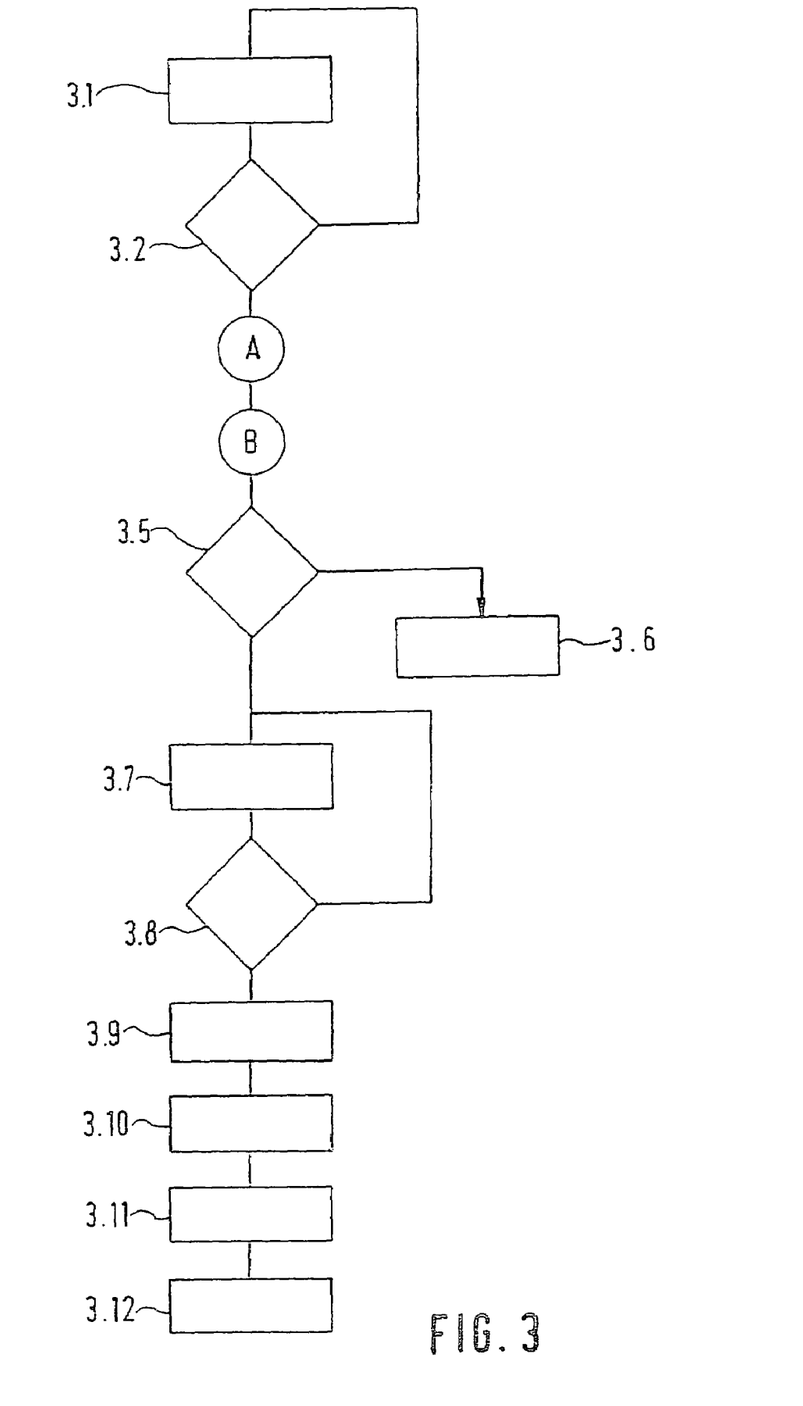
FIG. 3 shows an exemplary method according to the present invention in the form of a flow chart.

FIG. 3 shows a flow diagram as an exemplary method of the present invention, the way it may proceed in the composite of control units 32, 34 and 42 that communicate via bus system 46. In this context, block 3.1 represents a main program for controlling the piston engine, as it runs with respect to control, injection and ignition in engine control unit 32, and as it runs with respect to control of intake valve 18 and exhaust valve 36 in valve control unit 34.

In a step 3.2 it is checked whether the triggering conditions for blowing in secondary air are satisfied. The triggering conditions are satisfied typically when piston engine 10 has been started in the cold state. If this is not the case, the program branches back to main program 3.1. If, however, the blowing in of secondary air is to take place, then via marks A and B a step 3.5 is reached in which the relative charge of the combustion chamber or the combustion chambers is compared to a threshold value. The threshold value must be constituted in such a way that relative combustion chamber charges, which undershoot the threshold value, lead to a relatively low final combustion pressure in combustion chamber 12.

It has been shown that a threshold value of ca. 35% of the maximum combustion chamber charge, achieved under normal conditions, supplies this property. If this threshold value is exceeded in step 3.5, the blowing in of secondary air according to the exemplary method and/or embodiment of the present invention cannot be carried out via an opening of the intake valve in the range of bottom dead center of the piston after combustion. In this case, alternatively the program may branch to an engine control program module in a step 3.6, which operates the piston engine using a lean mixture to minimize hydrocarbon emissions.

In order to be able to carry out or performing the blowing in of secondary air using the exemplary method and/or embodiment of the present invention, piston engine 10 should be operated using low combustion chamber charges. This may be promoted by the sequence of steps 3.3 and 3.4 in FIG. 4. Therefore, these steps may be carried out in FIG. 3 between marks A and B that were mentioned.

Figure 4:
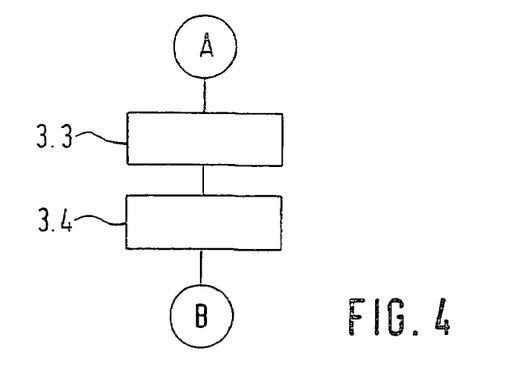
FIG. 4 shows a modification of the subject matter of FIG. 3.

For example, in a step 3.3 the idling speed may be lifted. An increased idling speed lowers the fresh air charge required for idling. In vehicles having automatic transmissions 44, in step 3.4 the transmission switching program in control unit 42 may additionally be changed in such a way that piston engine 10 is operated on the average with a higher rotary speed. Just as during idling, it is true in this case that the increased rotary speed goes along with a reduced charge, which simplifies or allows for the triggering of the blowing in of secondary air according to the exemplary method and/or embodiment of the present invention. If the combustion chamber charge is small enough, then in step 3.7 there takes place a determination of the piston position by evaluating inductive pickup 30. If the charge in the combustion chamber is known, one may conclude what the combustion chamber pressure is from the position of the piston. The closer the piston approaches bottom dead center in the combustion stroke, the larger becomes the combustion chamber volume above the piston, and the lower becomes the pressure in the combustion chamber. In explaining the remaining steps 3.8 to 3.12, we first of all explain below various signal patterns.

Figure 5:
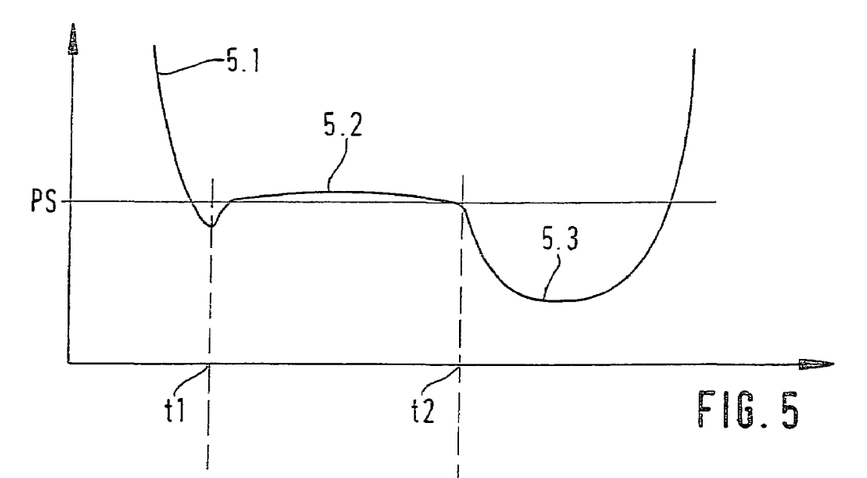
FIG. 5 shows the curve of a variable(s) plotted over time or plotted against the crankshaft angle, as it may appear during the execution of the exemplary method of the present invention.

FIG. 5 shows the curve of combustion chamber pressure for various crankshaft angle degrees, which correspond to various settings of piston 14. The section marked 5.1 corresponds to a falling of the combustion chamber pressure during and after combustion. At the moment at which the combustion pressure undershoots intake manifold pressure PS, a pressure drop is created at intake valve 18, which may be used to have secondary air flow in.

Figure 6:
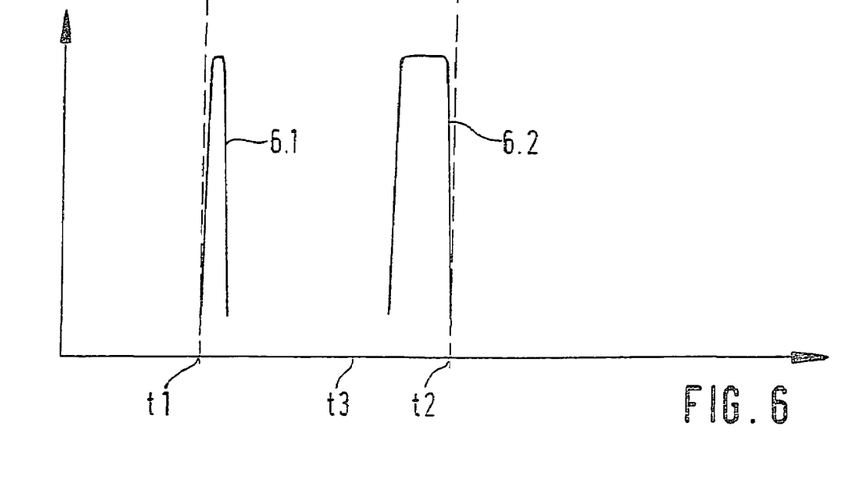
FIG. 6 shows the curves of a variable(s) plotted over time or plotted against the crankshaft angle, as it may appear during the execution of the exemplary method of the present invention.

FIG. 6 shows the valve lift of an intake valve 18. In this context, the tips correspond to a fully open valve. The left valve opening in FIG. 6 here corresponds to a second partial period. When intake valve 18 is open, air flows from the intake manifold into combustion chamber 12, which permits the pressure in the combustion chamber to rise to the value of the intake manifold pressure. This shows in the curve of section 5.2 in FIG. 5. The opening of intake valve 18 appertaining to the second partial period is denoted in FIG. 6 by the number 6.1. This opening lasts for only a relatively short time, since for oxidizing the residual gas resulting from the preceding combustion of the combustion chamber charge, no new charge of the combustion chamber is necessary. The new charge of the combustion chamber with fresh gas takes place by the wider valve opening pulse 6.2 in FIG. 6. This opening pulse 6.2 corresponds, in this context, to the abovementioned first partial period. Approximately between the two openings of intake valve 18, exhaust valve 36 is opened for expelling the residual gases that have been combusted and post-oxidized by the secondary air.

Figure 7:
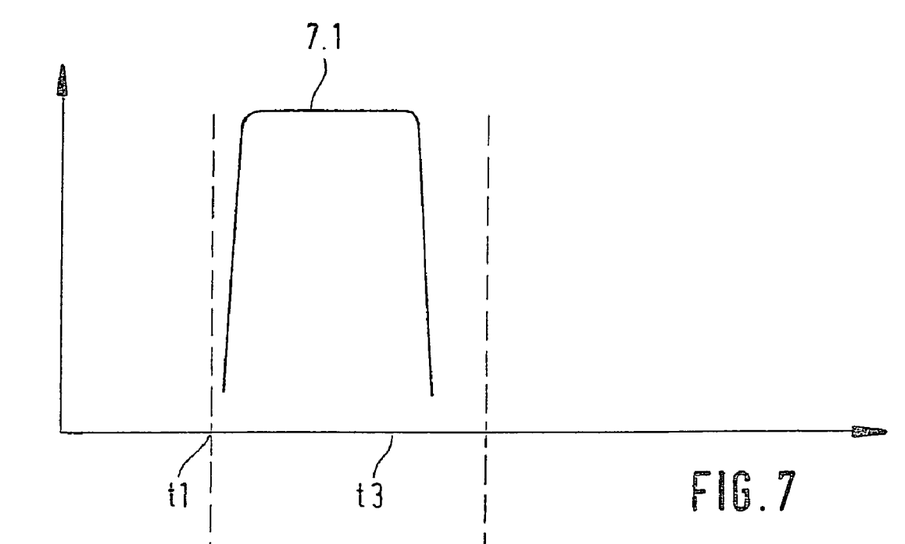
FIG. 7 shows the curve of a variable(s) plotted over time or plotted against the crankshaft angle, as it may appear during the execution of the exemplary method of the present invention.

The opening pulse for exhaust valve 36 is shown by curve 7.1 in FIG. 7. For this reason, the internal cylinder pressure remains within the range of the exhaust gas back pressure even after the closing of the intake valve. In this context, it is assumed that the exhaust gas back pressure corresponds approximately to the environmental pressure, which also prevails in the intake manifold. At point t3, exhaust gas valve 36 is closed, and at time t2 the intake process is also ended by closing intake valve 18. On the assumption that the combustion chamber charge is set via the intake valve and that the desired charge is relatively small, even a part of the downwards movement of piston 14 is sufficient for drawing in the desired charge. In this context, a pressure that is as high as possible in the intake manifold is advantageous. In a naturally aspirated engine this is approximately the environmental pressure. Therefore, at time t2, piston 14 has not yet arrived at its bottom dead center.

The further movement of piston 14 in the direction of its bottom dead center enlarges combustion chamber 12 if valves 18, 36 are closed, and thereby leads to an additional reduction in the pressure in the combustion chamber. There-after, the piston runs again in the direction of its top dead center, which permits the pressure in the combustion chamber to rise correspondingly. This rise after the temporary additional falling off is illustrated in FIG. 5, in curve section 5.3.

Figure 8:
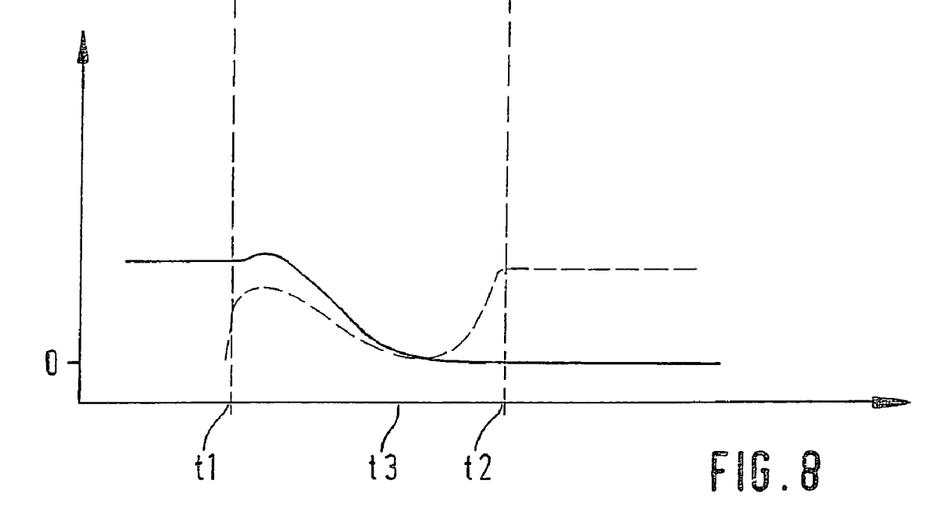
FIG. 8 shows the curves of a variable(s) plotted over time or plotted against the crankshaft angle, as it may appear during the execution of the exemplary method of the present invention.

The solid line in FIG. 8 shows the corresponding residual gas content in combustion chamber 12, and the dashed line in FIG. 8 shows the corresponding fresh air proportion. First of all, left of t1, there is only residual gas from the combustion in the combustion chamber. At time t1, intake valve 18 is opened at low final combustion pressure. As a result, no residual gas flows out of the combustion chamber, but fresh gas flow into the combustion chamber. The two gas components react with each other, which leads to a slight rise in the residual gas proportion at falling fresh gas proportion. Further along on the curve, both components fall off to a low value with exhaust valve 36 open, before the fresh gas proportion rises to its final value as a result of the opening intake valve 18. At time t2, this rise is closed off when intake valve 18 is closed.

In FIG. 3, steps 3.8 to 3.12 correspond to the signal curves described. If the query in 3.8 is answered yes, i.e. if the cylinder pressure undershoots the intake manifold pressure at the end of the combustion stroke, in the second partial period the intake valve is activated to open in step 3.9. Step 3.10 represents the opening of the exhaust valve corresponding to curve 7.1 in FIG. 7, and step 3.11 represents the opening of the intake valve in the first partial period corresponding to curve path 6.2 in FIG. 6. Step 3.12 represents a return to the main program.

The exemplary method according to the present invention is able to be used both for naturally aspirated engines and for pressure-charged engines. In turbocharged engines secondary air metering may be provided, according to the exemplary method of the present invention presented here, even in the case of larger cylinder charges, since the pressure in the intake manifold is greater for turbocharged engines, and the secondary air supply, according to the exemplary method and/or embodiment of the present invention, via an opened intake valve at the end of the combustion stroke presupposes a certain pressure drop at the intake valve. The exemplary method according to the present invention is particularly suitable for internal combustion engines/piston engines having direct gasoline injection, as shown in FIG. 1. In the case of manifold injection, the wall-applied fuel film on the inside wall of the intake manifold could prove to have a disruptive effect.

What is claimed is:

1. A method for controlling the opening of at least one intake valve of a combustion chamber in a periodically working piston engine, the method comprising:
   opening the at least one intake valve for charging the combustion chamber during a first partial period of a working period of the piston engine; and
   opening the at least one intake valve of the combustion chamber during a second partial period of the working period, wherein the second partial period begins in an expansion phase and has no overlap with the first partial period;
   wherein air from an intake manifold reaches the combustion chamber via the opening of the at least one intake valve during the second partial period of the working period.

2. The method of claim 1, wherein the second partial period begins before a bottom dead center of a piston allocated to the combustion chamber.

3. The method of claim 2, wherein the second partial period begins when a pressure on a side of an intake valve facing the combustion chamber undershoots a value of a pressure on a side of the intake valve facing away from the combustion chamber.

4. The method of claim 1, wherein at least one of a length of the second partial period and an extent of the opening of the intake valve is a function of an operating characteristic variable of the piston engine.

5. The method of claim 1, wherein the charging of the combustion chamber is limited by an early closing of the intake valve, and the openings are performed at an intake manifold pressure that is as high as possible.

6. The method of claim 1, wherein the openings are performed below a threshold value for a combustion chamber charge.

7. The method of claim 1, wherein at least one first intake valve is opened during the first partial period, and at least one second intake valve is opened during the second partial period.

8. A control unit for controlling the opening of at least one intake valve of a combustion chamber in a periodically working piston engine, comprising:
   a first arrangement to open the at least one intake valve for charging the combustion chamber during a first partial period of a working period of the piston engine; and
   a second arrangement to open the at least one intake valve of the combustion chamber during a second partial period of the working period, wherein the second partial period begins in an expansion phase and has no overlap with the first partial period;
   wherein air from an intake manifold reaches the combustion chamber via the opening of the at least one intake valve during the second partial period of the working period.

9. The control unit of claim 8, wherein the control unit increases an idling speed of the piston engine during the openings of the first and second partial periods.

10. The control unit of claim 9, wherein the control unit shifts at least one switching point of an automatic transmission to a high rotary speed during the openings of the first and second partial periods.

11. The control unit of claim 9, wherein the control unit operates the piston engine at a fuel/air mixture that is increasingly lean with an increasing combustion chamber charge during the openings of the first and second partial periods.

12. A method for controlling the opening of at least one intake valve of a combustion chamber in a periodically working piston engine, the method comprising:
   opening the at least one intake valve for charging the combustion chamber during a first partial period of a working period of the piston engine; and
   opening the at least one intake valve of the combustion chamber during a second partial period of the working period, wherein the second partial period begins in an expansion phase and has no overlap with the first partial period;
   wherein the charging of the combustion chamber is limited by an early closing of the intake valve, and the openings are performed at an intake manifold pressure that is as high as possible.

13. A method for controlling the opening of at least one intake valve of a combustion chamber in a periodically working piston engine, the method comprising:
opening the at least one intake valve for charging the combustion chamber during a first partial period of a working period of the piston engine; and
opening the at least one intake valve of the combustion chamber during a second partial period of the working period, wherein the second partial period begins in an expansion phase and has no overlap with the first partial period;
wherein the openings are performed below a threshold value for a combustion chamber charge.

* * * * *